Figure 1:
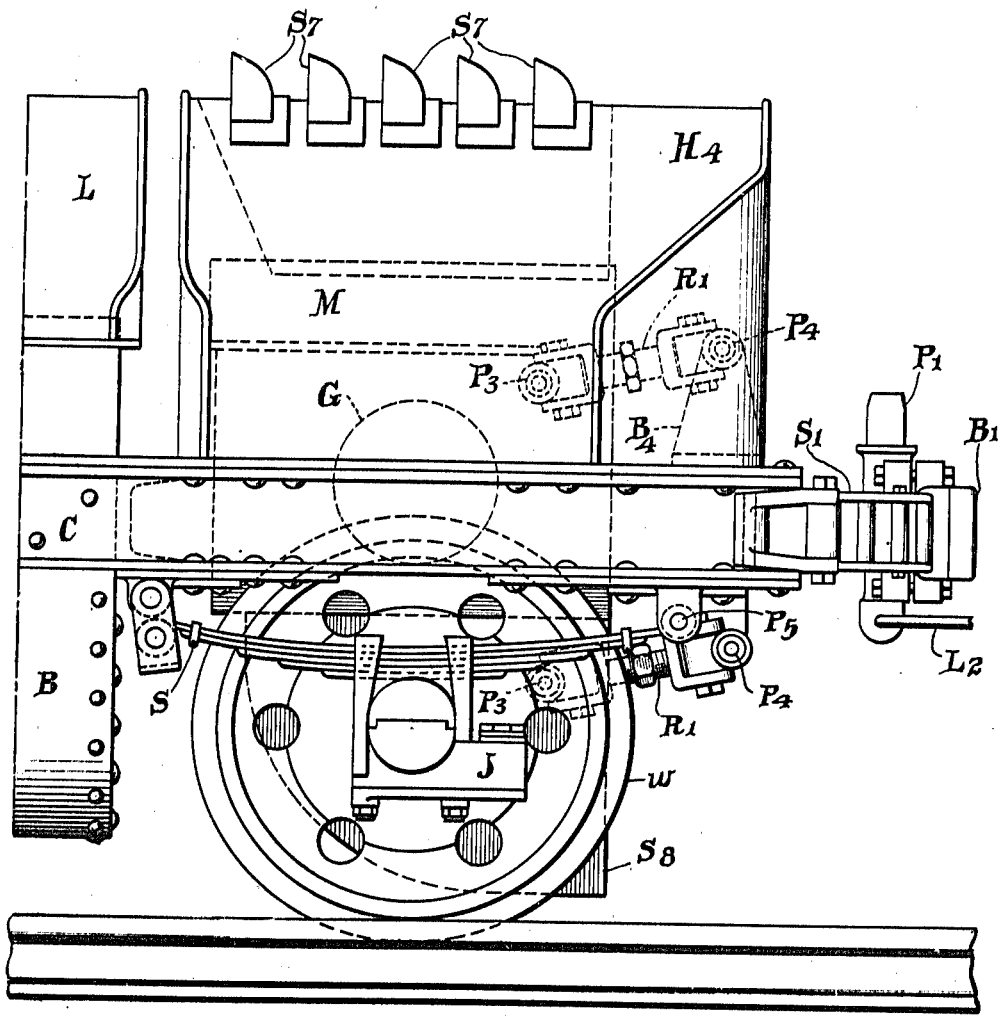

K. E. STUART.
MOTOR SUSPENSION.
APPLICATION FILED APR. 9, 1912.

1,040,810.

Patented Oct. 8, 1912.

2 SHEETS—SHEET 1.

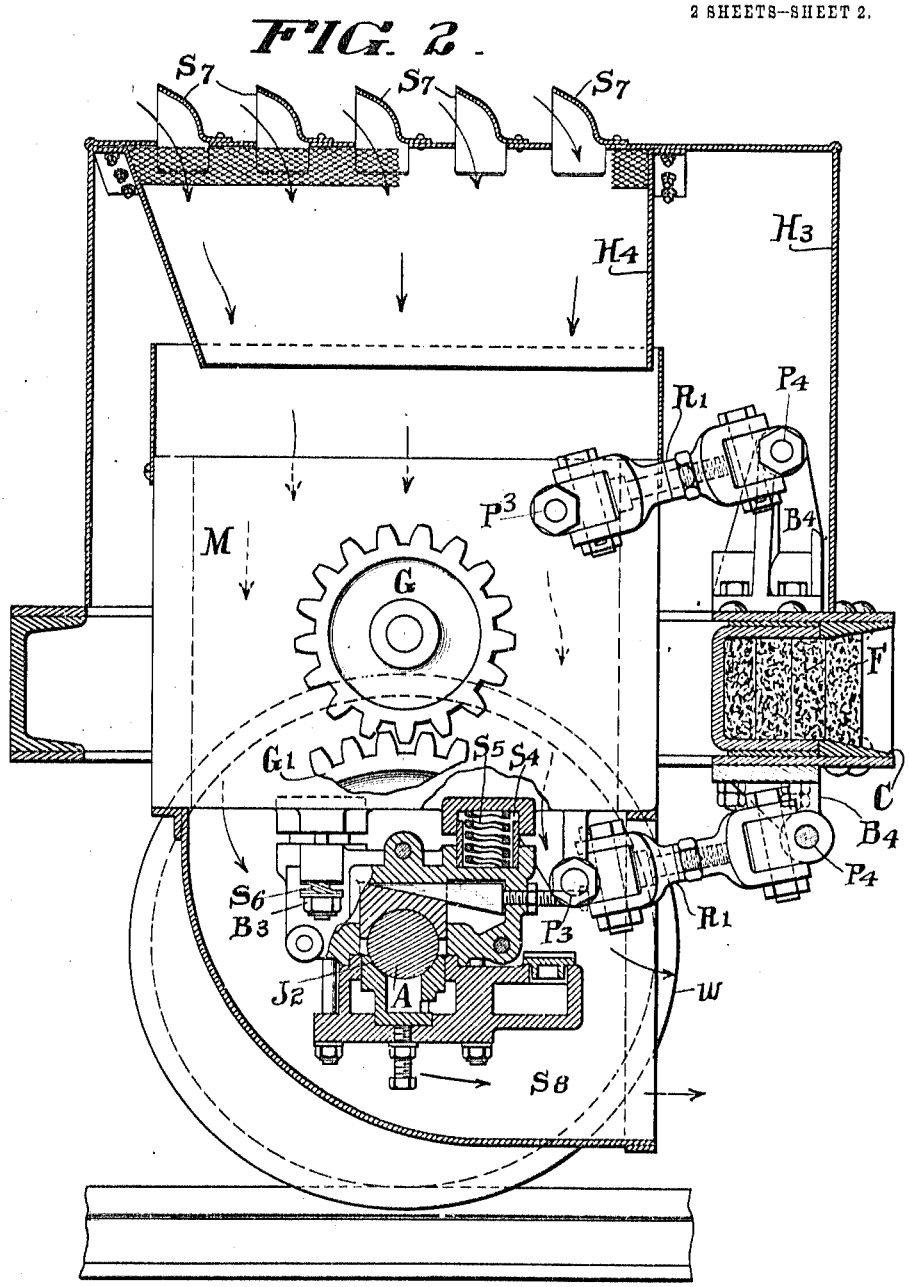

UNITED STATES PATENT OFFICE.

KENNETH E. STUART, OF PHILADELPHIA, PENNSYLVANIA.

MOTOR SUSPENSION.

1,040,810.  Specification of Letters Patent.  Patented Oct. 8, 1912.

Original application filed September 9, 1910, Serial No. 581,208. Divided and this application filed April 9, 1912. Serial No. 689,495.

*To all whom it may concern:*

Be it known that I, KENNETH E. STUART, a citizen of the United States, residing in the city of Philadelphia, county of Philadelphia, and State of Pennsylvania, have invented a new and useful Motor Suspension, of which the following is a specification.

My invention relates to improvements in railway motor vehicles, and particularly to a motor vehicle employing an electric motor for driving the same.

My invention resides in means for maintaining the motor in a given position with respect to the driven axle of the vehicle, and more particularly to maintaining the motor vertically over the driven axle, whereby the relative positions of the motor and driven axle remain unchanged during vertical movements of the car or vehicle frame.
For an illustration of one of the forms my invention may take, reference is to be had to the accompanying drawings, in which:

Figure 1 is a side elevational view of a vehicle having my improved motor mounting thereon. Fig. 2 is a view, some parts in side elevation, and some in section, on enlarged scale, showing the mounting of the electric motor and other features.

C represents the frame of the car or vehicle and is here shown as of a rolled channel section.

A is the driven axle carrying the vehicle wheel $w$.

M is the motor which drives the pinion G meshing with the gear $G^1$ secured upon the driven axle A.

The under side of the motor is provided with sockets $S^4$ into which fit helical springs $S^5$ resting in similar sockets in the pedestal, which is journaled upon the axle A at $J^2$. The holding-down bolts $B^3$ are likewise provided with spring washers $S^6$. The motor drives the driving wheel $w$ through a pinion G and gear $G^1$ in the usual way, the gear teeth being of the involute type, which mesh properly at varying distances, and sufficient clearance being allowed between the gears to permit of the desired compression of the spring $S^5$.
To maintain the motor vertically over the axle A the radius rods $R^1$ are provided. These rods are pivoted to the motor at one end and to the brackets $B^4$ at the other end in the points $P^3$ and $P^4$ respectively. The brackets $B^4$ are carried by the channel section C, which is supported by leaf springs S from the axle A (Fig. 1). The leaf springs have their outer ends pivoted to the frame C and may be considered as radius rods pivoted at $P^5$ (Fig. 1) and at the center of the axle. The length and angle of the radius rods $R^1$ are so calculated that they form with each other and with the pivoted halves of the leaf springs substantially a parallel motion, and as the channel C rises and falls the position of the motor relative to the axle is therefore unaffected. Owing to this manner of suspending the motor as above described it is particularly easy to efficiently ventilate and cool it and the various parts adjacent thereto. To this end scoops $S^7$ are provided at the top of a hood $H^3$ which incloses the motor. These scoops project above the periphery of the car in a position to trap the air and deflect it downward. The top of the motor housing M' is open and there are likewise openings in its bottom. The air is guided from the scoops into the motor by means of the hopper $H^4$ and the circulation is assisted by a large socket or scoop $S^8$ beneath the motor which is directed toward the rear and surrounds the axle bearing by which the motor is supported as shown.

This application is a division from my application Serial No. 581,208, filed September 9, 1910.

What I claim is:—

1. The combination with a car frame, of a driving wheel axle, a motor for driving said axle, members pivotally supporting said car frame upon said axle independently of said motor, and parallel rods pivoted to said motor and to said car frame independently of said axle.

2. The combination with a car frame, of a driving wheel axle, a journal for said axle, members pivotally supporting said car frame upon said journal, a motor for driving said axle, and parallel rods pivoted to said motor and to said car frame independently of said axle.

3. The combination with a car frame, of a driving wheel axle, springs pivotally supporting said car frame upon said axle independently of said motor, and parallel rods pivoted upon said motor and upon said car frame independently of said axle.

4. The combination with a motor frame, of a driving wheel axle, a motor for driving said axle, members pivotally supporting said car frame upon said axle, resilient means intervening between said motor and said axle, and parallel rods pivoted upon said motor and said car frame independently of said axle.

5. The combination with a car frame, of a driving wheel axle, a motor for driving said axle, means disposed in a plane at right angles to said axle pivotally supporting said car frame upon said axle, and parallel rods pivoted upon said motor and upon said frame disposed in a plane at right angles to said axle.

6. The combination with a car frame, of a driving wheel axle, a motor for driving said axle, the shaft of said motor disposed substantially vertically above said axle, means pivotally supporting said car frame upon said axle, resilient means intervening between said motor and said axle, and parallel rods pivoted to said motor and to said car frame independently of said axle.

7. The combination with a car frame, of a driving wheel axle, a motor for driving said axle, the shaft of said motor disposed substantially vertically above said axle, means pivotally supporting said car frame upon said axle, and parallel rods pivoted to said motor and to said car frame independently of said axle.

In testimony whereof I have hereunto affixed my signature in the presence of the two subscribing witnesses.

KENNETH E. STUART.

Witnesses:
H. D. JAMESON,
O. J. WORTH.